United States Patent

Mer et al.

[11] Patent Number: 5,277,456
[45] Date of Patent: Jan. 11, 1994

[54] ADAPTOR FOR USE WITH ELECTROFUSION FITTINGS

[75] Inventors: Zalman Mer, Kfar Saba; Ernest Lever, Kibbutz Maagan Michael, both of Israel

[73] Assignee: Plasson Margan Michael Industries Ltd., Kibbutz Maagan Michael, Israel

[21] Appl. No.: 32,035

[22] Filed: Mar. 16, 1993

[30] Foreign Application Priority Data

Mar. 19, 1992 [IL] Israel ................................ 101297

[51] Int. Cl.$^5$ ............................................. F16L 13/02
[52] U.S. Cl. ................................. 285/21; 285/39; 285/174
[58] Field of Search ............... 285/21, 174, 175, 22

[56] References Cited

U.S. PATENT DOCUMENTS

| | | | |
|---|---|---|---|
| 4,093,280 | 6/1978 | Yashizawa et al. | 265/174 X |
| 4,682,797 | 7/1967 | Hildner | 285/21 X |
| 4,784,409 | 11/1988 | Piechowiok | 285/21 |
| 5,150,922 | 9/1992 | Nakashiba et al. | 285/21 |

FOREIGN PATENT DOCUMENTS

| | | | |
|---|---|---|---|
| 2253085 | 10/1900 | Japan | 285/21 |
| 675902 | 11/1990 | Switzerland | 285/21 |

Primary Examiner—Dave W. Arola
Attorney, Agent, or Firm—Benjamin J. Barish

[57] ABSTRACT

An adaptor for use with an electrofusion fitting for enabling a thermoplastic pipe to be coupled to a dissimilar pipe includes a housing sleeve for coupling at one end to the dissimilar pipe with the opposite end being formed on its outer surface with an annular ribbed section covered by a plastic sleeve. An anchoring ring overlies the annular ribbed section of the housing sleeve and is effective to firmly anchor the plastic sleeve to the annular ribbed section of the housing sleeve during electrofusion of the plastic sleeve to one end of an electrofusion fitting, and of the plastic pipe to the opposite end of the electrofusion fitting.

9 Claims, 2 Drawing Sheets

5,277,456

ADAPTOR FOR USE WITH ELECTROFUSION FITTINGS

FIELD AND BACKGROUND OF THE INVENTION

The present invention relates to an adaptor for use with an electrofusion fitting for adapting a plastic pipe to be coupled to a dissimilar pipe.

Electrofusion fittings are now widely used in coupling together two pipes of plastic material. Such electrofusion fittings include electrical heating coils which are energized, after the plastic pipes have been inserted into the opposite ends of the fitting, to bond the two pipes together via the electrofusion fitting. However, the conventional electrofusion fitting is not suitable for use where the two pipes to be coupled together are not both of plastic material, for example where one pipe is of metal and the other pipe is of thermoplastic material.

OBJECTS AND BRIEF SUMMARY OF THE INVENTION

An object of the present invention is to provide an adaptor for use with an electrofusion fitting to be bonded to one end of a plastic pipe in order to enable the thermoplastic pipe to be coupled to a dissimilar pipe, such as a pipe made of a metal, a thermosetting plastic, or another type of thermoplastic.

According to the present invention, there is provided an adaptor for use with an electrofusion fitting for enabling a plastic pipe to be coupled to a dissimilar pipe, comprising: a housing sleeve formed at one end with coupling means for coupling the dissimilar pipe thereto, the opposite end of the housing sleeve being formed on its outer surface with an annular ribbed section; a plastic sleeve covering the opposite end of the housing sleeve including its annular ribbed section; and an anchoring ring overlying the annular ribbed section of the housing sleeve and effective to firmly anchor the plastic sleeve to the annular ribbed section of the housing sleeve during electrofusion of the plastic sleeve to one end of an electrofusion fitting, and of the plastic pipe to the opposite end of the electrofusion fitting.

For example, the plastic sleeve, and the plastic pipe to which the dissimilar pipe is to be coupled, may be made of a thermoplastic material such as polyethylene, polypropylene or polybutylene. However, thermosetting polymers can also be used, such as cross-linked polyethylene, so long as the plastic sleeve is bondable to the plastic pipe.

The housing sleeve and the anchoring ring may be made of metal, such as stainless steel, brass and mild steel. The components may also be made from glass or fiber reinforced polymers, such as nylon, acetal resins, polyvinyl chloride, etc.

As will be described more particularly below, such an adaptor may be bonded by an electrofusion fitting to one end of a plastic pipe, with the opposite end available for mechanically coupling another pipe, such as a pipe made of metal or of a dissimilar plastic.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
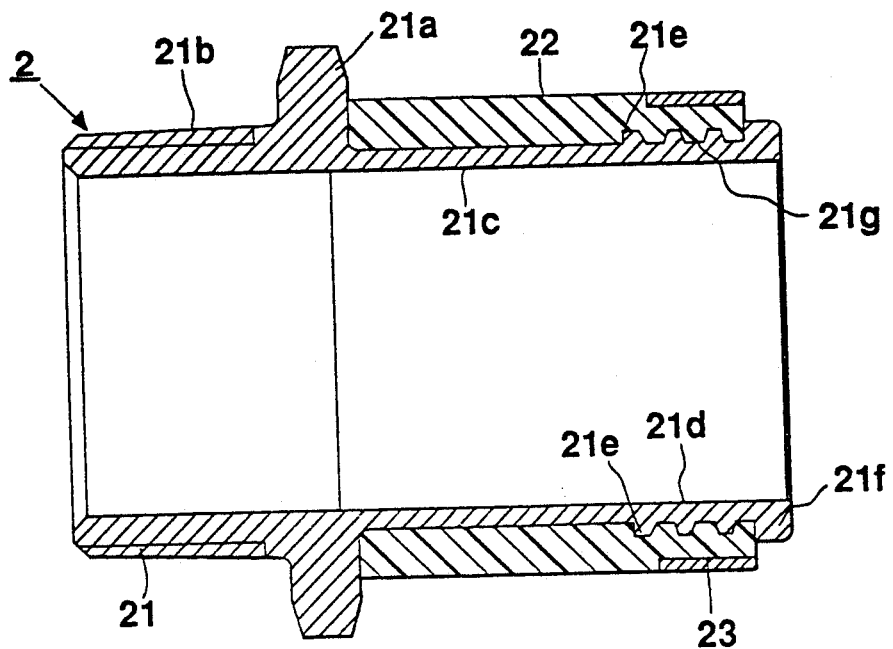
FIG. 1 is a longitudinal sectional view illustrating one form of adaptor constructed in accordance with the present invention.
Figure 2:
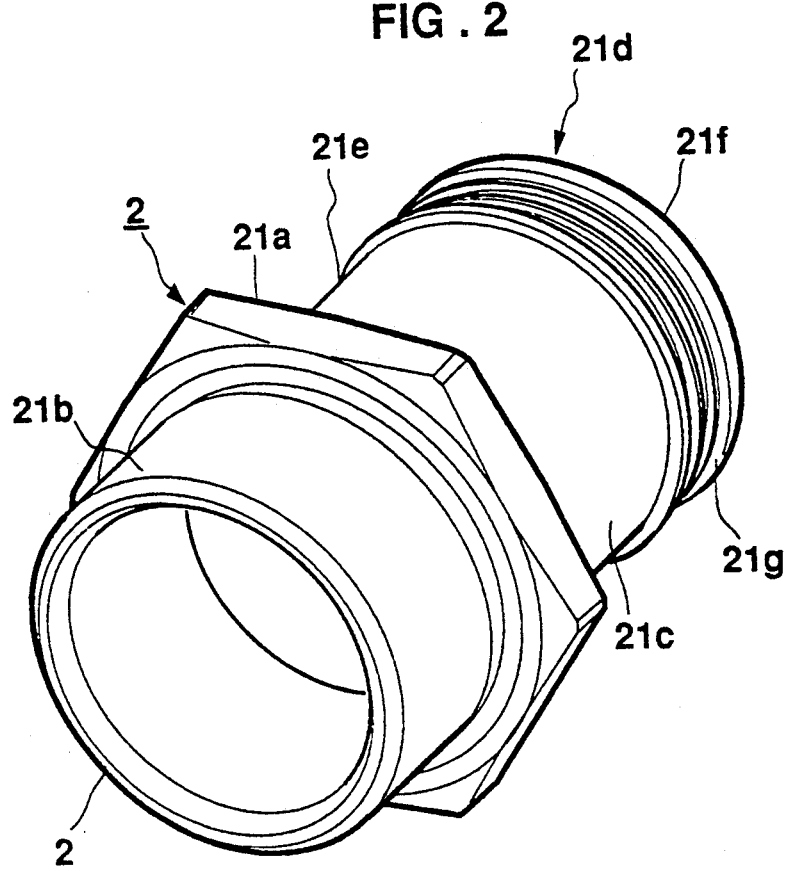
FIG. 2 is a three-dimensional view illustrating only the housing sleeve in the adaptor of FIG. 1.
Figure 3:
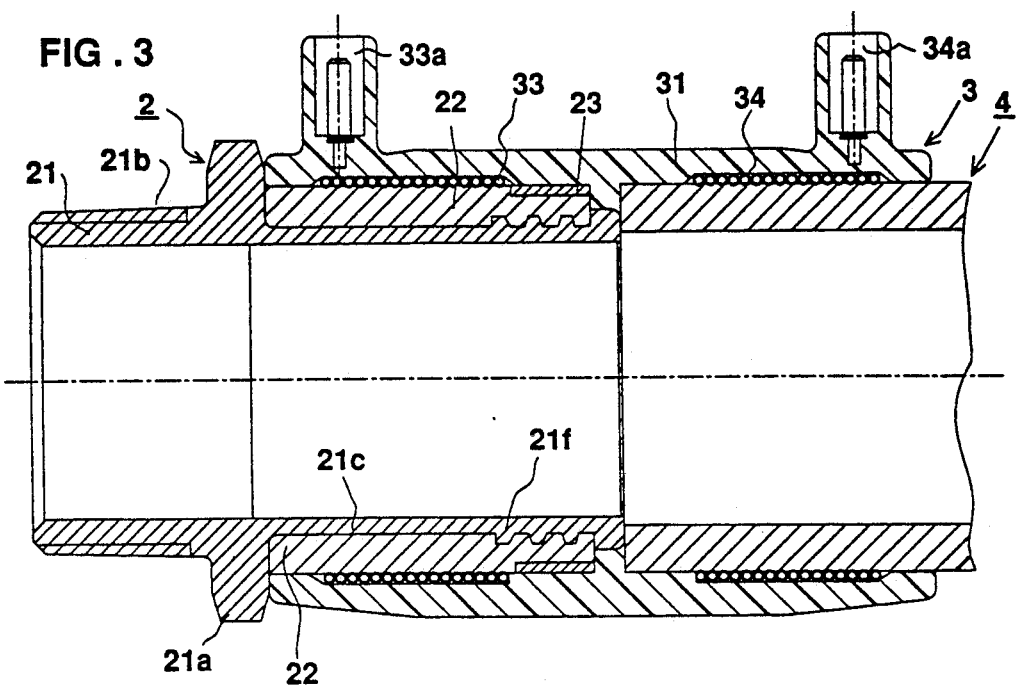
FIG. 3 is a longitudinal sectional view illustrating the adaptor of FIG. 1 bonded by electrofusion to one end of a plastic pipe.

With reference to the embodiment of FIGS. 1-3, the adaptor 2 illustrated in FIG. 1 is adapted to be bonded, by means of an electrofusion fitting generally designated 3 in FIG. 3, to one end of a plastic pipe 4, to enable the plastic pipe to be coupled to a dissimilar pipe, such as a metal pipe.

The adaptor 2, as more particularly illustrated in FIGS. 1 and 2, comprises three main elements, namely: a housing sleeve 21, a thermoplastic sleeve 22 on one end of the housing sleeve, and an anchoring ring 23 over one end of the thermoplastic sleeve 22.

The housing sleeve 21 is integrally formed at an intermediate portion thereof with an outwardly extending polygonal (hexagonal) nut section 21a for receiving a wrench. One end of the housing sleeve, on one side of the polygonal nut section 21a, has an outer surface which is threaded, as shown at 21b, and is also of conical configuration, decreasing in diameter towards the outer end of that section. The opposite end 21c of the housing sleeve 21, on the opposite side of the polygonal nut section 21a, is of uniform diameter for the major portion of its length, but includes an outer ribbed section, shown at 21d. The latter section includes an outer face formed with a pair of annular ribs 21e, 21f, and a plurality of annular grooves 21g for firmly anchoring the outer thermoplastic sleeve 22 thereto, as will be described more particularly below.

The outer thermoplastic sleeve 22 encloses the end 21c of the housing sleeve 21 on the right side of the polygonal nut section 21a. The thermoplastic sleeve 22 is firmly held between the polygonal nut section 21a of the housing sleeve 21, and the ribbed end section 21d of the housing sleeve.

Anchoring ring 23 is applied over the ribbed end section 21d of the housing sleeve 21. As described more particularly below, ring 23 serves to firmly anchor the thermoplastic sleeve 22 to the housing sleeve 21 during the bonding of the adaptor 2 to the electrofusion fitting 3.

The electrofusion fitting 3, as shown in FIG. 3, includes a thermoplastic sleeve 31. A first electrical heating coil 33 is embedded adjacent the inner surface of fitting 3 on one side of its inner rib 32, and a second electrical heating coil 34 is embedded on the inner surface of the fitting at the opposite side of its rib 32. The two electrical heating coils 33 and 34 are electrically connected and may be energized simultaneously via externally-exposed electrical terminals 33a and 34a, respectively.

Adaptor 2 may be inserted into on side of the electrofusion fitting 3, and the thermoplastic pipe 4 may be inserted into the opposite side of fitting 3. The two electrical heating coils 33, 34 may then be energized via their electrical terminals 33a, 34a. The heat generated by the heating coil 33 softens the inner surface of the thermoplastic sleeve 31 of the electrofusion fitting 3 and also the outer surface of the thermoplastic sleeve 22 of the adaptor 2, thereby producing a strong bond or weld between the two surfaces when they cool. Anchoring ring 23 prevents any radially-outward expansion of the respective end of the thermoplastic sleeve 22, thereby forcing the plastic sleeve to firmly bond to the ribs 21e, 21f and grooves 21g of the ribbed section 21d of the housing sleeve 21.

The heat generated by the heating coil 34 softens the inner surface of the electrofusion fitting 31 and also the outer surface of the thermoplastic pipe 4, thereby producing a strong bond or weld between the two when they cool.

The thermoplastic pipe 4, with the adaptor 2 welded to one end by the electrofusion fitting 3, may thus be coupled to a dissimilar pipe, such as a metal pipe, via the external threads 21b at the end of the adaptor.

Figure 4:
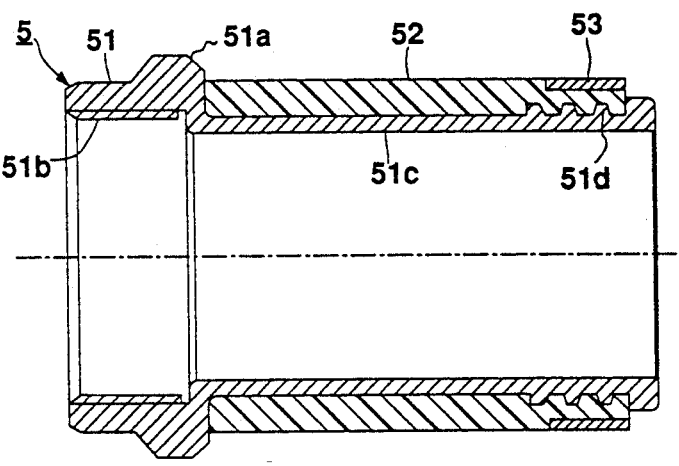
FIG. 4 is a longitudinal sectional view illustrating a second form of adaptor constructed in accordance with the present invention.
Figure 5:
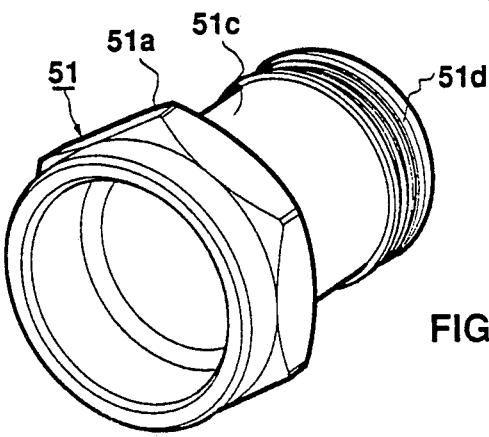
FIG. 5 is a three-dimensional view illustrating only the housing sleeve in the adaptor of FIG. 4.

It will be appreciated that the adaptor 2 can be selected according to the dissimilar pipe to be coupled to the plastic pipe 4. FIGS. 4 and 5 illustrate another adaptor construction which can be used for this purpose.

Thus, the adaptor illustrated in FIGS. 4 and 5, and therein generally designated 5, also includes a housing sleeve 51 formed with an outwardly-extending polygonal nut section 51a for receiving a wrench. One end of the housing sleeve 51 is covered by an outer thermoplastic sleeve 52 electrofusion fitting, such as fitting 3 illustrated in FIGS. 1-3. The opposite end of the electrofusion fitting is to be bonded to the plastic pipe, e.g., pipe 4 in FIG. 3.

In the adaptor construction illustrated in FIGS. 4 and 5, the end of the adaptor to be coupled to the dissimilar pipe (e.g., a metal pipe) is formed with internal threads 51b for this purpose. The remainder of the adaptor 5 illustrated in FIGS. 4 and 5 is otherwise of the same construction as described above with respect to FIGS. 1-3, including the uniform diameter section 51c and the outer ribbed section 51d on the housing sleeve, the outer plastic sleeve 52, and the anchoring ring 53.

It will thus be seen that when an adaptor, such as illustrated in FIGS. 4 and 5, is welded by the electrofusion fitting to one end of a plastic pipe, the plastic pipe is thus enabled to be coupled to another dissimilar pipe, such as one of metal, via the internal threads 51b of the adaptor.

The adaptor can be of other constructions, to enable coupling the respective end of the plastic pipe 4 to a dissimilar pipe by other means, such as by welding, brazing or adhesives. It will also be appreciated that the adaptor can be joined to other types of plastic pipes, such as elbows, tees, and the like.

Many other variations, modifications and applications of the invention will be apparent.

What is claimed is:

1. An adaptor for use with an electrofusion fitting for enabling a thermoplastic pipe to be coupled t a dissimilar pipe, comprising: a housing sleeve formed at one end with coupling means for coupling said dissimilar pipe thereto, the opposite end of the housing sleeve being formed on its outer surface with an annular grooved and ribbed section; a plastic sleeve covering said opposite end of the housing sleeve including its annular grooved and ribbed section and interlocked therewith to anchor said plastic sleeve to said housing sleeve, said opposite end of said housing sleeve extending at least the length of said plastic sleeve and in contact therewith for the length of said plastic sleeve; and an anchoring ring overlying said annular grooved and ribbed section of the housing sleeve and engaging said plastic sleeve and being effective to firmly anchor the plastic sleeve to the annular grooved and ribbed section of the housing sleeve during electrofusion of the plastic sleeve to one end of an electrofusion fitting, and of the plastic pipe to the opposite end of the electrofusion fitting.

2. The adaptor according to claim 1, wherein said housing sleeve is made of metal.

3. The adaptor according to claim 1, wherein said housing sleeve is made of a dissimilar plastic material from said outer plastic sleeve.

4. The adaptor according to claim 1, wherein said housing sleeve is integrally formed with an outwardly-extending polygonal nut section adapted to receive a wrench for coupling said dissimilar pipe to the adaptor.

5. The adaptor according to claim 4, wherein said anchoring ring is of metal.

6. The adaptor according to claim 4, wherein said anchoring ring is of a dissimilar plastic material from said outer plastic sleeve.

7. The adaptor according to claim 1, wherein said coupling means on one end of said housing sleeve includes threads formed on the outer surface of said housing sleeve.

8. The adaptor according to claim 1, wherein the outer surface of the housing sleeve on said one end thereof is of conical configuration, decreasing in diameter towards the outer end thereof.

9. The adaptor according to claim 1, wherein said coupling means includes threads formed on the inner surface of said housing sleeve.

* * * * *